(12) United States Patent
Hyakutake et al.

(10) Patent No.: US 6,664,777 B2
(45) Date of Patent: Dec. 16, 2003

(54) PHOTOMETRIC APPARATUS AND PHOTOMETRIC METHOD

(75) Inventors: Kenji Hyakutake, Chiba-ken (JP); Hiroyuki Saito, Chiba-ken (JP); Kazuyuki Akiyama, Chiba-ken (JP)

(73) Assignee: Seiko Precision Inc., Chiba-ken (JP)

( * ) Notice: Subject to any disclaimer, the term of this patent is extended or adjusted under 35 U.S.C. 154(b) by 0 days.

(21) Appl. No.: 09/961,827

(22) Filed: Sep. 24, 2001

(65) Prior Publication Data

US 2002/0093346 A1 Jul. 18, 2002

(30) Foreign Application Priority Data

Nov. 29, 2000 (JP) ........................................ 2000-362472

(51) Int. Cl.[7] .............................................. G01R 22/00
(52) U.S. Cl. ..................................... 324/76.17; 324/711
(58) Field of Search .................. 250/214 A; 324/76.17, 324/711; 356/223; 396/213

(56) References Cited

U.S. PATENT DOCUMENTS

| | | | |
|---|---|---|---|
| 4,433,914 A | * | 2/1984 | Curran ........................ 356/223 |
| 5,192,968 A | * | 3/1993 | Kishida et al. .............. 396/213 |
| 5,198,660 A | * | 3/1993 | Yokoyama ............... 250/214 A |
| 5,214,274 A | * | 5/1993 | Yang ....................... 250/208.1 |
| 5,448,056 A | * | 9/1995 | Tsuruta ................... 250/214 A |
| 5,585,844 A | * | 12/1996 | Hieda et al. ................ 348/224 |

* cited by examiner

Primary Examiner—N. Le
Assistant Examiner—Walter Benson
(74) Attorney, Agent, or Firm—Jordan and Hamburg LLP

(57) ABSTRACT

Photometric apparatus and photometric method measure a wide range of incident light amounts accurately and efficiently. The photometric apparatus includes an optical sensor for delivering a photocurrent; an integrator capacitor for integrating the photocurrent to provide an integrated voltage; a voltage measurer measuring the integrated voltage; an integration time measure for measuring an integration time which the integrator capacitor integrates the photocurrent; for resetting the integrator capacitor whenever the voltage across the integrator capacitor exceeds a given voltage value; a summer summing a total voltage value integrated by the integrator capacitor during the given time including at least one reset; and a photometric calculator for calculating a photometric value based on the total voltage value and on the integration time.

10 Claims, 14 Drawing Sheets

PHOTOMETRIC APPARATUS AND PHOTOMETRIC METHOD

BACKGROUND OF THE INVENTION

1. Field of the Invention

The present invention relates generally to a photometric apparatus and photometric method and, more particularly, to a photometric apparatus and photometric method for obtaining photometric values by making use of an integrator capacitor that integrates a photocurrent produced from an optical sensor.

2. Description of the Related Art

A conventional photometric apparatus for obtaining photometric values by utilizing an integrator capacitor that integrates a photocurrent produced from a light-receiving device such as an optical sensor is disclosed, for example, in Japanese Patent Laid-Open No. 324328/1992. In the conventional technique disclosed in the specification of this laid-open publication, whenever charging voltage for an integrator capacitor charged with a photocurrent reaches a reference voltage, a pulse is produced. A photometric value is obtained either based on the number of pulses produced for a given time or from the time in which the charging voltage reaches the reference voltage.

However, where a photometric value is obtained based on the number of pulses produced in a given period with this conventional example, the same number of pulses are produced, whether the given time passes immediately after a certain pulse is generated or the given time passes immediately prior to generation of the next pulse. Therefore, the same photometric value is indicated, although the actual amounts of light incident on the optical sensor differ in practice. That is, the conventional example has the problem that the same photometric value is output if actual amounts of brightness (amounts of light) are different, thus providing poor accuracy. Where the time taken to reach the reference voltage is measured and the amount of incident light is calculated from the measuring time, if the amount of light incident on the optical sensor is small, a long time is necessary. Hence, the efficiency is low.

SUMMARY OF THE INVENTION

It is an object of the present invention to provide a photometric apparatus and photometric method capable of measuring a wide range of incident light amounts accurately and efficiently.

To achieve the above-described object, the present invention provides a photometric apparatus comprising: an optical sensor for generating a photocurrent according to the amount of incident light; an integrator capacitor for integrating the photocurrent from the optical sensor; a voltage detection means for detecting the voltage across the integrator capacitor; an integration time-measuring means for measuring an integration time for which the integrator capacitor integrates the photocurrent; resetting-and-controlling means for resetting the integrator capacitor whenever the voltage across the integrator capacitor exceeds a given voltage value; a totalizing means for finding a total voltage value integrated by the integrator capacitor during a given time; and a photometric means for finding a photometric value based on the total voltage value and on the integration time from the integration time-measuring means.

According to the configuration of the present invention described above, the photometric value is found based on the total integrated voltage value and integration time, the total integrated voltage value being owing to the photocurrent integrated by the integrator capacitor for the given time. Therefore, accurate photometry can be carried out. Furthermore, whenever the voltage across the integrator capacitor exceeds the given voltage, the integrator capacitor is reset. Also, the total voltage value integrated by the integrator capacitor for the given time is found. A voltage value exceeding the capacitance of the integrator capacitor is obtained as the total voltage value. Consequently, the capacitance of the integrator capacitor can be reduced. If an integrator capacitor with a small capacitance is used, high-resolution photometry can be performed.

Furthermore, the present invention provides a photometric apparatus that is based on the above-described configuration and further characterized in that the integration time measured by the integration time-measuring means during the given time is made equal to the given time subtracted by the time for which the resetting- and-controlling means are resetting the integrator capacitor during the given time.

In this configuration, the actual integration time within the given time can be found accurately. Therefore, accurate photometry can be carried out.

In addition, the present invention provides a photometric apparatus that is based on the above-described configuration and further characterized in that the totalizing means accumulates the difference between the voltage value of the integrator capacitor at the start of integration and the voltage value of the integrator capacitor immediately prior to resetting done by the resetting-and-controlling means after the start of the integration on each resetting during a given time to thereby obtain a sum value and that the difference between the voltage value of the integrator capacitor after a lapse of a given time and the voltage value of the integrator capacitor at the start of integration is added to the aforementioned sum value, thus deriving the total voltage value.

This configuration makes it possible to find the total voltage value accurately, the total voltage value being owing to integration by the integrator capacitor within the given time. Hence, accurate photometry can be carried out.

Further, the present invention provides a photometric apparatus that is based on the above-described configuration and further characterized in that the given time is 9.2 milliseconds or an integral multiple of it.

In this configuration, execution of accurate photometry is enabled if the amount of incident light varies (e.g., alternates) when the light is alternating light such as light from a fluorescent lamp.

Additionally, the present invention provides a photometric apparatus that is based on the above-described configuration and further characterized in that a voltage detection means has a detector for detecting the voltage across the aforementioned integrator capacitor at regular intervals of time. In this apparatus, the given voltage for the resetting-and-controlling means is set lower as the amount of incident light is increased.

In this configuration, if the amount of incident light is large and the voltage integrated by the integrator capacitor rises at a high rate, the voltage across the integrator capacitor is prevented from reaching the saturation range in the detection range of the detection portion or the saturation range of the integrator capacitor itself on detection of the detection portion. In consequence, accurate photometry can be performed.

Further, the present invention provides a photometric apparatus that is based on the above-described configuration and further characterized in that at least two integrator capacitors having different capacitances are included and that these capacitors are selectively used, only one at a time, according to the amount of incident light.

In this configuration, the capacitance of the integrator capacitor can be selected according to the amount of incident light. Therefore, high-resolution photometry can be carried out.

Further, the present invention provides a photometric apparatus that is based on the above-described configuration and further characterized in that the voltage detection means has an A/D converter for converting the voltage value across the integrator capacitor into a digital value at regular intervals of time except during resetting performed by the resetting-and-controlling means and that the integration time-measuring means measures a product as an integration time, the product being obtained by multiplying the number of A/D conversions made by the A/D converter within a given time by a certain period.

This configuration makes it possible to accurately find the actual integration time within the given time. Consequently, accurate photometry can be performed.

Further, the present invention provides a photometric apparatus that is based on the above-described configuration and further characterized in that at least two optical sensors are included and that these sensors are selectively used, only one at a time. This configuration can cope with multiple-split photometry.

Another aspect of the present invention provides a photometric method comprising the steps of: (a) producing a photocurrent according to the amount of incident light; (b) integrating the photocurrent; (c) detecting the voltage obtained by integrating the photocurrent; (d) resetting the integration whenever the integrated voltage exceeds a given voltage and repeating the steps (b), (c), and (d); (e) finding a total voltage value integrated during a given time; (f) measuring the time for which the photocurrent is integrated; and (g) finding a photometric value based on the integration time and on the total voltage value. This method involving these steps permits execution of accurate photometry.

DESCRIPTION OF THE PREFERRED EMBODIMENTS

Embodiments of the present invention are hereinafter described by referring to the accompanying drawings.

Figure 1:
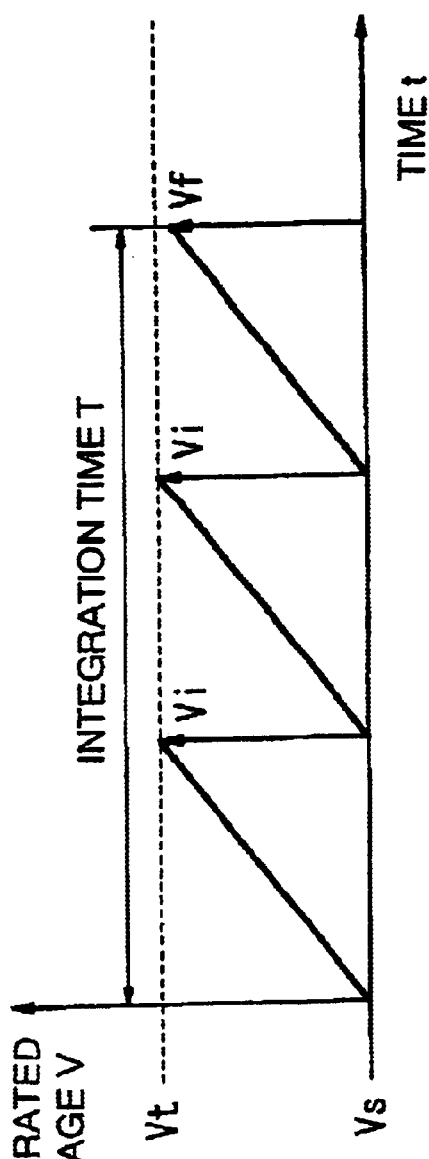
FIG. 1 is a diagram illustrating the principle of a photometric apparatus in accordance with the present invention.
Figure 1:
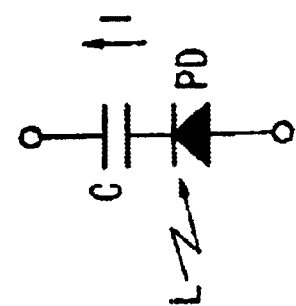

FIG. 1 shows the principle of a photometric apparatus in accordance with the present invention. The inventive photometric apparatus is used, for example, in an exposure meter for a camera or the like. The apparatus measures the amount of light incident from a subject within a given time to thereby measure the brightness of the subject.

The light L from the subject is converted into a photocurrent I proportional to the amount of the incident light L by an optical sensor such as a photodiode PD. This photocurrent I is stored in an integrator capacitor and integrated. An integrated voltage V is developed across the integrator capacitor. The brightness of the subject is in proportion to the amount of incident light L, i.e., the photocurrent I, and has the following relation $$\text{brightness of the subject} = \alpha I \tag{1}$$

where $\alpha$ is a proportional constant.

Electric charge stored in the integrator capacitor during an integration time t is equal to I t. Assuming that the integrator capacitor has a capacitance of C, the integrated voltage V across the integrator capacitor has the relation that C V=I t. Accordingly, the brightness of the subject has the following relation $$\text{brightness of the subject} = \frac{\alpha C V}{t} \tag{2}$$

The brightness of the subject can be found if the integrated voltage V and the integration time t are known.

The proportional constant $\alpha$ and the capacitance C of the integrator capacitor are values previously determined by the circuit. Therefore, if the proportional constant $\alpha$, the capaci tance C of the integrator capacitor, and the integration time t can be known, then we can have $$\beta = \frac{\alpha C}{t}$$

The brightness of the subject can be found from the integrated voltage V based on the relational formula brightness of the subject=$\beta$V  (3)

In the graph of FIG. 1, the integration time t of the integrator capacitor is indicated on the horizontal axis and the integrated voltage V is on the vertical axis. Photocurrent I is started to be integrated in the integrator capacitor C from an integration start voltage Vs. The integration is reset whenever the difference between the integrated voltage Vi and the integration start voltage Vs, i.e., Vi−Vs, exceeds a given threshold voltage Vt. Then, the integration is repeated. Whenever the integration is reset, the voltage difference (Vi−Vs) is added and stored. Note that Vi and Vs may differ among individual resetting operations. When a given time T passes, the integration is stopped. Let Vf be the integrated voltage across the integrator capacitor C when the integration is stopped. The voltage difference (Vf−Vs) obtained when the given time T has passed is detected, added, and stored. That is, the final voltage difference (Vf−Vs) is added to the voltage difference (Vi−Vs) added on each resetting. The sum is taken as the total voltage value VT of the integration.

The remaining time, i.e., the given time T subtracted by the non-integration time of the integrator capacitor accompanying the resetting operation, is taken as the actual integration time t. The brightness of the subject can be precisely found based on Eq. (2) above, using the actual integration time t and total voltage value VT found in this way.

Figure 2:
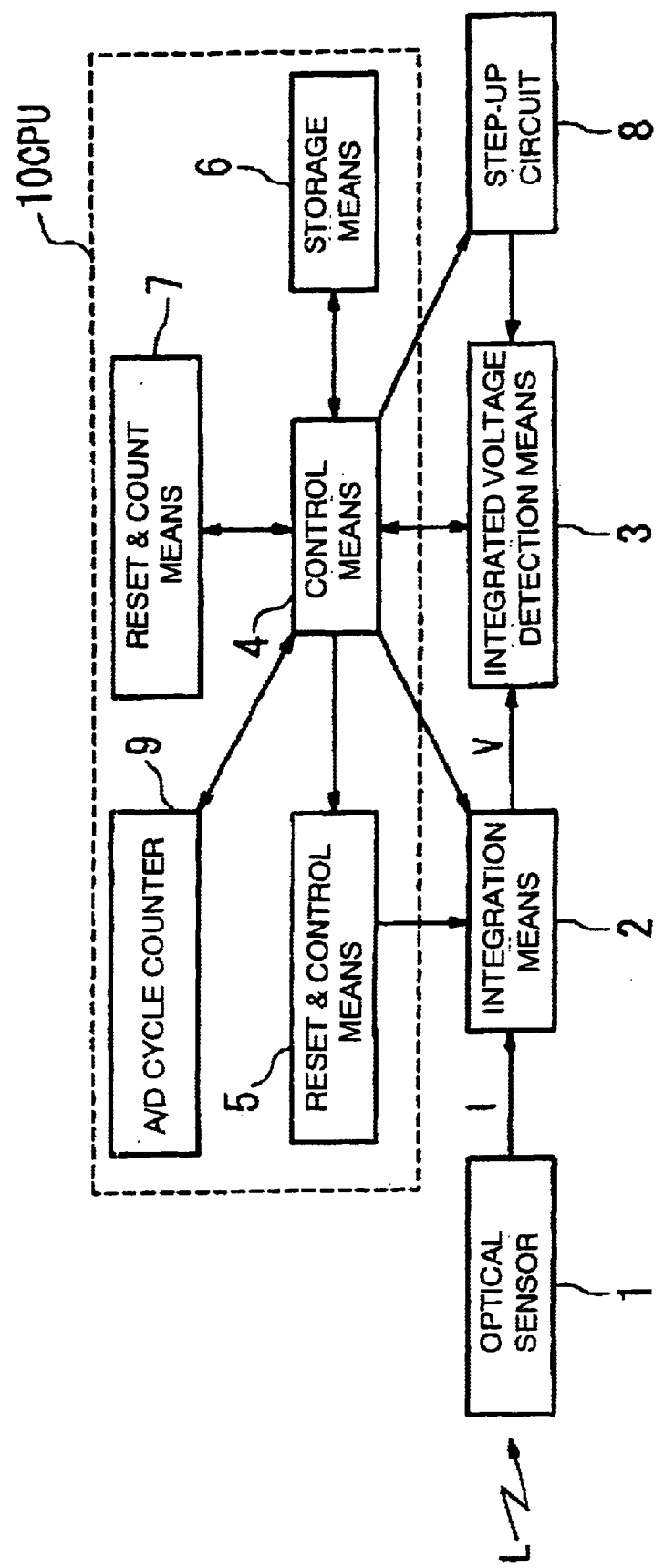
FIG. 2 is a block diagram of a photometric apparatus in accordance with one embodiment of the invention.

FIG. 2 shows a block diagram of a schematic structure of a photometric apparatus in accordance with one embodiment of the present invention that realizes the inventive principle described above. An optical sensor 1 consists of a photodiode or the like, receives incident light L, and produces a photocurrent I proportional to the amount of the light. The photocurrent I produced from the optical sensor 1 is sent to an integration means 2 including an integrator capacitor. This integration means 2 integrates the photocurrent I during a given time T. The integrated voltage V is detected by an integrated voltage detection means 3. The integrated voltage detection means 3 converts the integrated voltage V into digital form at regular intervals of time except during resetting of the integrator capacitor. The results are sent to a CPU 10, which incorporates an arithmetic-and-control circuit, a RAM, a flash memory, etc. The CPU 10 has a control means 4, a resetting-and-controlling means 5, a storage means 6, an A/D cycle counter 9 for measuring the integration time, and a reset counter means 7 in terms of functions.

The control means 4 causes the resetting-and-controlling means 5 to reset the integration means 2 if the integrated voltage of the integration means 2 exceeds the given value Vt. The control means 4 cooperates with the storage means 6 to constitute a totalizing means. The integration start voltage Vs, integrated voltage Vi occurring when the integration means is reset beyond the threshold value Vt, and an integrated voltage Vf on passage of the given time T are stored in the storage means 6. The control means 4 forms a photometric means and counts the number of output events from the integrated voltage detection means that receives at regular intervals from the A/D cycle counter 9 acting as an integration time-measuring means. In this way, the control means measures the actual integration time t that is the given time T for integration excluding the non-integration time for the integration means 2 accompanying resetting. Furthermore, the control means 4 causes the reset counter means 7 to count the number of resets N of the integration means 2. The control means 4 constitutes a photometric means for finding the brightness of the subject (amount of measured light) based on the integrated total voltage value VT accumulatively stored in the storage means 6 and on the actual integration time t counted by the A/D cycle counter 9. The control means 4 stores the found photometric value and parameters in the storage means 6, the parameters including the capacitance C of the integrator capacitor and the proportional constant $\alpha$ used in finding the photometric value. In addition, the control means 4 controls a step-up circuit 8 to create a step-up voltage necessary for the camera.

Figure 3:
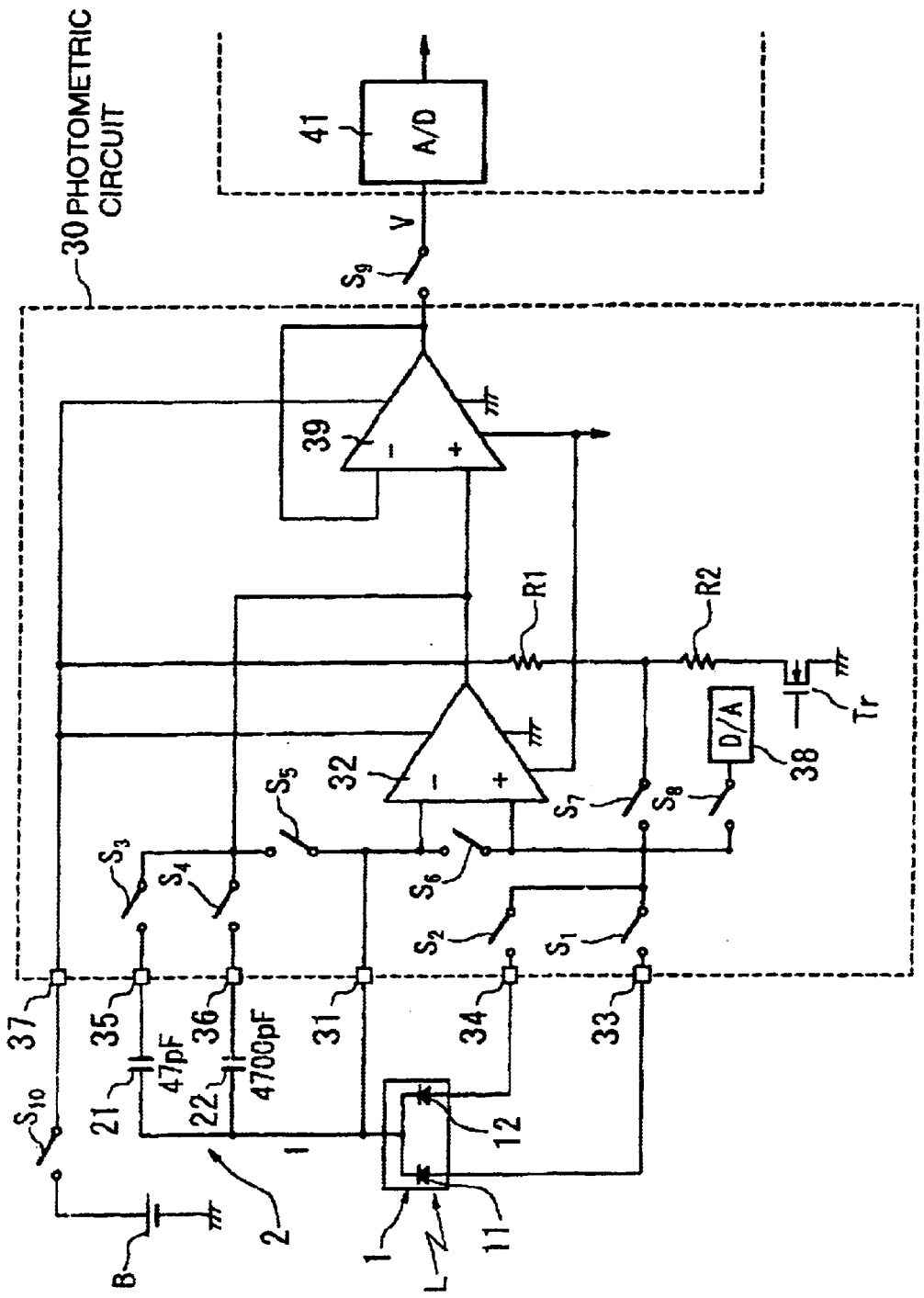
FIG. 3 is a circuit diagram particularly showing parts of the block diagram of FIG. 2.

FIG. 3 particularly shows the optical sensor 1, integration means 2, and integrated voltage detection means 3 (photometric circuit 30) of FIG. 2. The optical sensor 1 is equipped with two photodiodes 11 and 12 of amorphous silicon, for example. The cathode terminals of these photodiodes are connected with respective one end of two integrator capacitors 21 and 22 of the integration means 2. The capacitors 21 and 22 have capacitances of 47 pF and 4700 pF, respectively. It is to be noted that the capacitances of the integrator capacitors 21 and 22 are not limited to the above-described values. Any appropriate modification is possible as long as their capacitances are different from each other. The cathode terminals of the photodiodes 11 and 12 are connected with the negative terminal of an operational amplifier 32 for integration via a common terminal 31. The anodes of the photodiodes 11 and 12 are connected with selector switches s1 and s2, respectively, via terminals 33 and 34, respectively. Hence, either the photodiode 11 or 12 is selected. The two amorphous silicon optical sensors 11 and 12 are devices for two-split photometry. In the case of single photometry, only one of the switches s1 and s2 is connected and used.

The other ends of the integrator capacitors 21 and 22 are connected with selector switches s3 and s4 via terminals 35 and 36, respectively. Any one of the integrator capacitors 21 and 22 is selected according to switching of the selector switches s3 and s4 and connected with the output terminal of the operational amplifier 32 for integration. The output terminal of the operational amplifier 32 for integration and switches s5 and s6 connected in series to connect the negative and positive terminals, respectively, are resetting switches. The electric charge stored in the integrator capacitors 21 and 22 is discharged by turning on the switches s5 and s6. Switches s7 and s8 are switches for switching the reference voltage. The switch s7 divides the voltage (e.g., 5 V) of a power supply B for photometry by voltage-dividing resistors R1 and R2 via a terminal 37 and a switch s10. The obtained voltage is applied as a reference voltage to the positive terminal of the operational amplifier 32 for integration. The voltage is also applied to the anodes of the photodiodes 11 and 12 via the switches s1 and s2, respectively. An n-channel transistor Tr interlocks with the switch s7. When the switch s7 turns on, the n-channel transistor Tr is also turned on. This adjusts the current flowing through the voltage-dividing resistors R1 and R2, thus regulating the reference voltage. When the switch s7 is turned on in use, the reference voltage is clamped at a divided voltage of 1.5 V, for example. However, where the switch s7 is turned off and the switch s8 is turned on in use, the reference voltage can be delivered and varied in arbitrary voltage increments of 1.0 V to 4.0 V by a D/A converter 38.

The switch s9 is a switch for applying the integrated voltage V generated from the operational amplifier 32 for integration via an operational amplifier 39 for buffering to an A/D converter 41.

The switches s1–s10 are controlled by the control means 4, resetting-and-controlling means 5, etc. included in the CPU 10, select and reset integrator capacitors 21, 22, select the reference voltage, select the photodiodes 11, 12, energize the photometric circuit 30, and control outputting of the integrated voltage V to the A/D converter 41.

The photometric circuit 30 can be so manufactured that the portion indicated by the broken line is included in an integrated circuit. The reference voltage is connected to the positive input terminal of the operational amplifier 32 for integration. The anode of the photodiode 11 or 12 is connected with this positive input terminal of the amplifier 32 via the switch s1 or switch s2. The cathodes of the photodiodes 11 and 12 are connected with the negative input terminal of the integration operational amplifier 32 via the terminal 31. The integrator capacitor 21 or 22 is connected with the output terminal of the integration operational amplifier 32 via the switch s3 or switch s4. The output terminal of the operational amplifier 32 for integration is connected with the positive terminal of the operational amplifier 39 for buffering. The terminal 37 is a power-supply terminal for supplying electric power to the operational amplifiers 32 and 39 via the switch s10. The operational amplifiers 32 and 39 do not operate unless the switch 10 is ON. The operational amplifiers 32 and 39 have enable inputs to suppress unwanted power consumption in the operational amplifiers 32 and 39.

Figure 4:
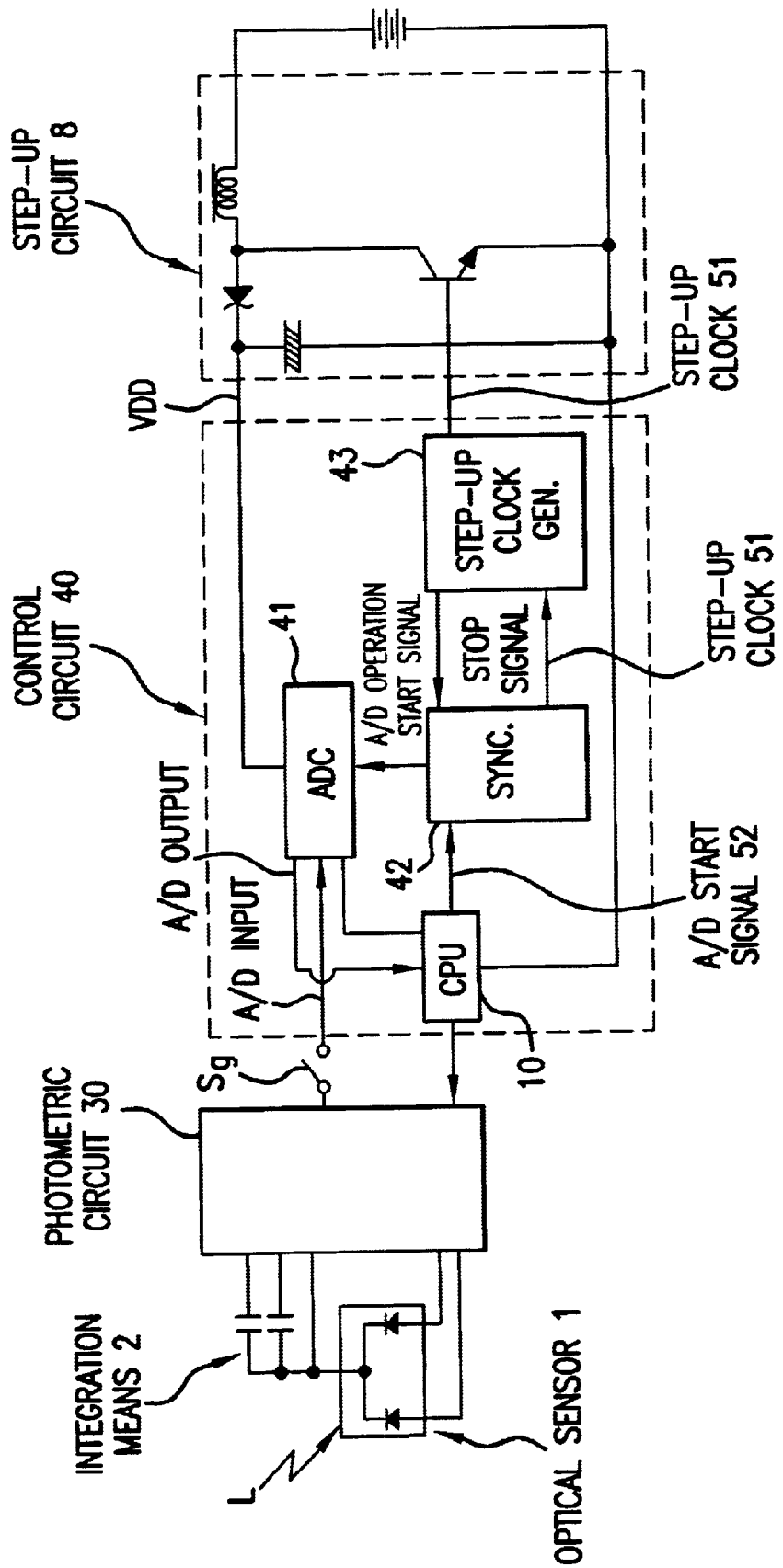
FIG. 4 is a block diagram particularly showing other parts of the block diagram of FIG. 2.

FIG. 4 shows a control circuit 40 and the step-up circuit 8, the control circuit 40 including the A/D converter 41 for converting the analog integrated voltage V from the photometric circuit 30 into digital form, the CPU 10, a synchronizing circuit 42, and a step-up clock-generating circuit 43. The CPU 10 includes the control means 4 to which the output from the A/D converter is applied, the resetting-and-controlling means 5, the storage means 6, and the reset counter 7.

The integrated voltage V is applied to the A/D converter 41 via the switch s9. The CPU 10 delivers an A/D start signal to the synchronizing circuit 42. This synchronizing circuit 42 sends an A/D operation start signal to the A/D converter 41 and sends a stop signal to the step-up clock-generating circuit 43. The step-up clock-generating circuit 43 generates a step-up clock signal for controlling the step-up circuit 8.

Figure 5:
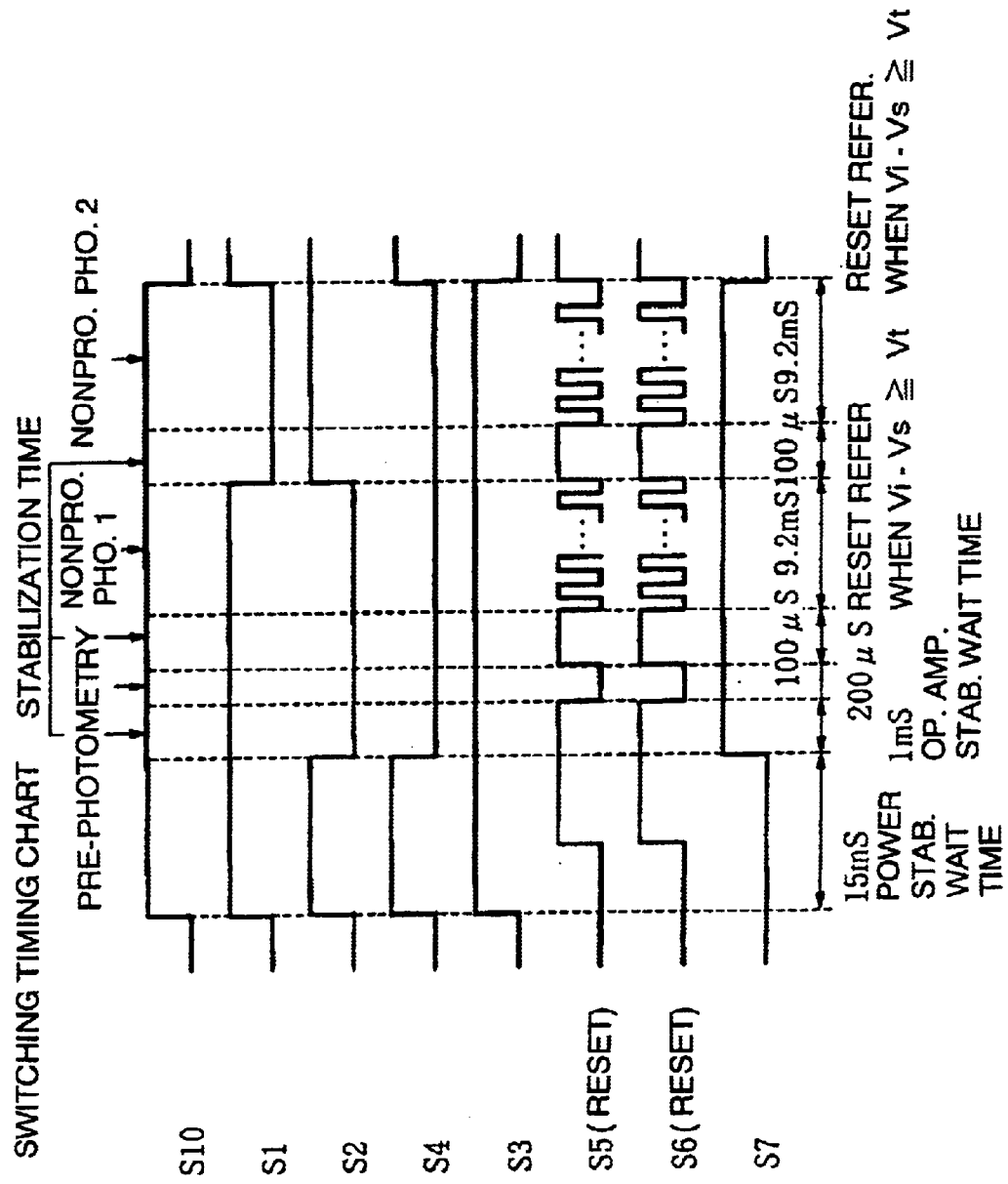
FIG. 5 is a switching timing chart, illustrating the operation of the photometric apparatus in accordance with one embodiment of the invention.
Figure 6:
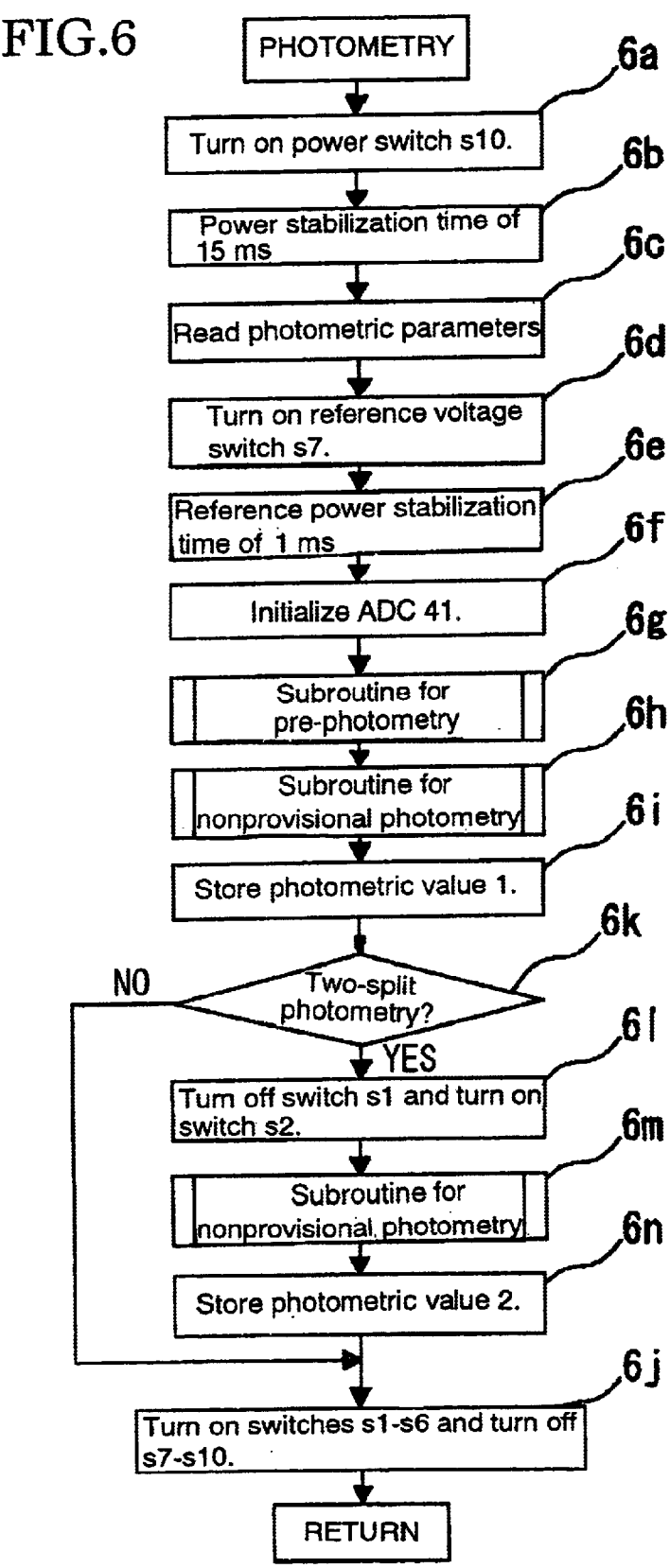
FIG. 6 is a flowchart illustrating the operation of the photometric apparatus in accordance with one embodiment of the invention.

The operation of the photometric apparatus in accordance with the present embodiment is described by referring to the switching timing chart of FIG. 5 and the flowchart of FIG. 6. The power supply switch s10 is turned on (step 6a), and the control means 4 waits for about 15 ms until the power-supply voltage stabilizes (step 6b). During this interval, the control means 4 reads necessary parameters from a nonvolatile memory (not shown) such as a flash memory and stores them into the storage means 6 (step 6c). The switch s7 is turned on if the power-supply voltage stabilizes (step 6d). The control means applies a reference voltage of 1.5 V to the operational amplifier 32 and waits for about 1 ms until the reference voltage stabilizes (step 6e). The control means initializes the A/D converter 41 (step 6f).

Figure 7:
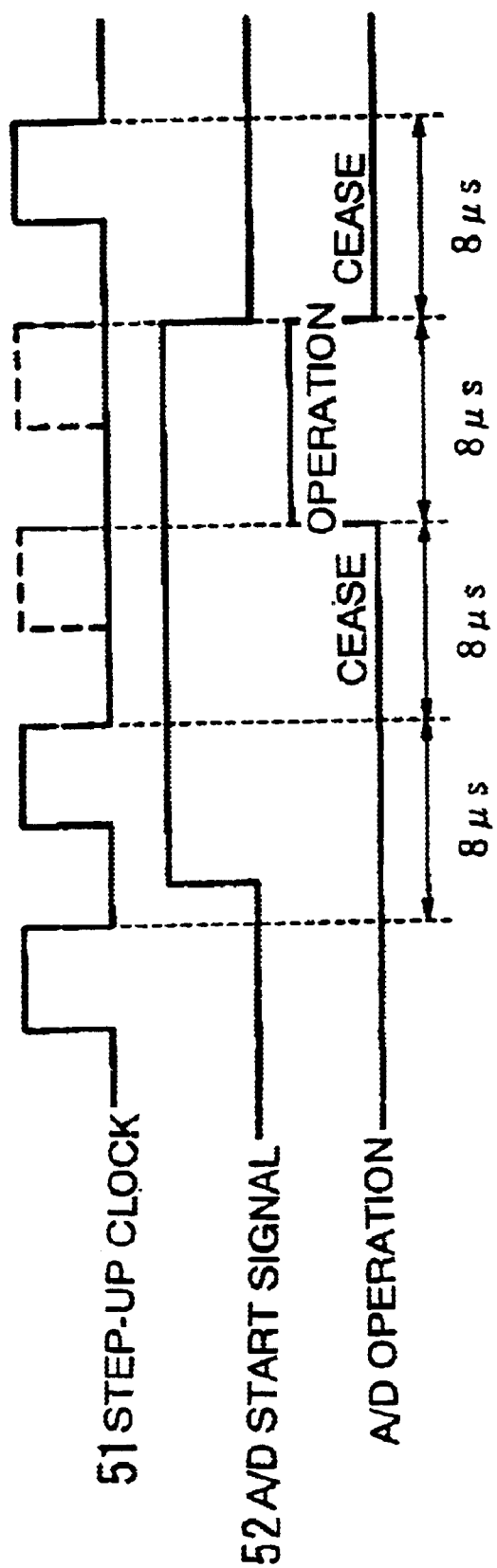
FIG. 7 is a timing chart illustrating the operation of an A/D converter in the photometric apparatus in accordance with one embodiment of the invention.

In the present embodiment, when analog to digital conversion is performed, an A/D start signal 52 as shown in FIG. 7 is sent from the control means 4 in the CPU 10 to the synchronizing circuit 42 in synchronism with an ON signal for the switch s9. The synchronizing circuit 42 sends a stop signal to the step-up clock-generating circuit 43, thus stopping step-up clock 51. Because of the structure of the camera, the step-up circuit 8 steps up the 3V power to the necessary 5 V. At this time, there is the danger that ripple is produced in the power supply, making nonuniform the analog to digital conversion operation of the A/D converter 41. To avoid this undesirable situation, the stop signal from the synchronizing circuit 42 stops the step-up clock 51 in the step-up clock-generating circuit 43 during A/D conversion operation. This temporarily stops the step-up circuit 8, thus improving the accuracy of the analog to digital conversion.

As shown in FIG. 7, when A/D conversion start signal 52 is applied to the synchronizing circuit 42 from the CPU 10, the synchronizing circuit 42 delivers the A/D operation start signal to the A/D converter 41 after a lapse of 8 $\mu$s since the trailing edge of the step-up clock 51 applied to the synchronizing circuit 42. At the same time, the synchronizing circuit delivers a step-up clock stop signal to the step-up clock-generating circuit 43, thus stopping the step-up clock 51. It takes 8 $\mu$s to perform the analog to digital conversion. The step-up clock has a period of 8 $\mu$s. Therefore, the analog to digital conversion is set into operation after a lapse of 8 $\mu$s since the trailing edge of the step-up clock 51. Also, the step-up clock 51 is stopped. Since the analog to digital conversion ends after 8 $\mu$s, the step-up clock stop signal is stopped from being delivered after the end of the analog to digital conversion. The outputting of the step-up clock 51 is resumed.

Figure 8:
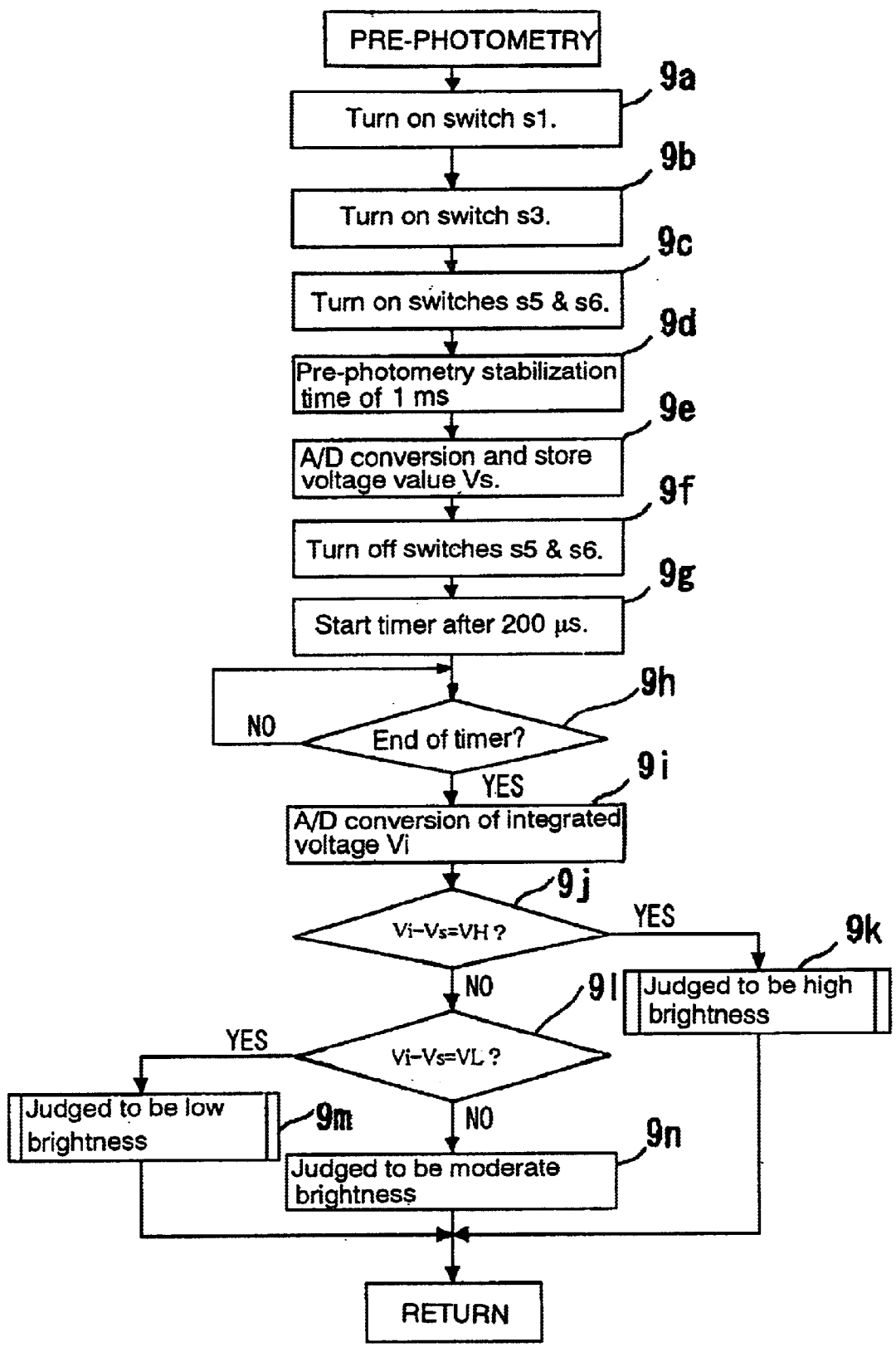
FIG. 8 is a flowchart illustrating a pre-photometric operation of the photometric apparatus in accordance with one embodiment of the invention.

Then, pre-photometric operation (step 6g of FIG. 6) previous to the nonprovisional photometry is described by referring to the flowchart of FIG. 8 and the switching timing chart of FIG. 5. The switch s1 is turned on to connect the anode of the amorphous silicon optical sensor 11 with the positive input terminal of the operational amplifier 32 (step 9a). After a lapse of 10 $\mu$s, the switch s3 is turned on to connect the integrator capacitor 21 having a capacitance C of 47 pF with the output terminal of the operational amplifier 32 (step 9b). The switches s5 and s6 are turned on to reset the integrator capacitor 21 (step 9c).

Preferably, the output current from the amorphous silicon optical sensor 11 is quite weak during low brightness and maintained in a reset state until becomes stabilized. In the present embodiment, a stabilization time of 1 ms is established (step 9d).

The analog output voltage from the operational amplifier 32 in a reset state is then converted into digital form by the A/D converter 41. The voltage value is stored as Vs into the storage means 6 within the CPU 10 (step 9e). Thereafter, the switches s5 and s6 are turned off to cancel the resetting condition. Then, an integration is started (step 9f). The CPU 10 executes the integration by the integrator capacitor 21 for a period of 100 $\mu$s measured by a timer (not shown). After a lapse of 200 $\mu$s, the integrated voltage of the integrator capacitor 21 is converted into digital form and stored as voltage value Vi in the storage means 6 (steps 9g, 9h, and 9i).

The magnitude of the voltage difference (Vi−Vs) obtained by pre-photometry is compared with a given value VH (step 9j). If the difference (Vi−Vs) is greater than VH, the brightness is judged to be high (step 9k). If the difference (Vi−Vs) is smaller than another given value VL (step 9l), the brightness is judged to be low (step 9m). If the difference falls under none of these conditions (step 9n), the brightness is judged to be moderate. In this way, brightness values are classified into three categories. Where one wants to subclassify the low brightness, the pre-photometry time may be set to 200 μs, for example, and lower values of the difference (Vi–Vs) may be classified and assigned to the fourth lower brightness category.

If the brightness of the incident light L can be judged to fall under the low, moderate, or high brightness category by the pre-photometry, the integrator capacitor 21 having a capacitance of 47 pF is subsequently used in cases of low and moderate brightnesses. In the case of high brightness, the integrator capacitor 22 having a capacitance of 4700 pF is used. In this way, the capacitance of the integrator capacitor is switched according to the brightness level. As a result, the resolution of the photometry can be enhanced.

Figure 9:
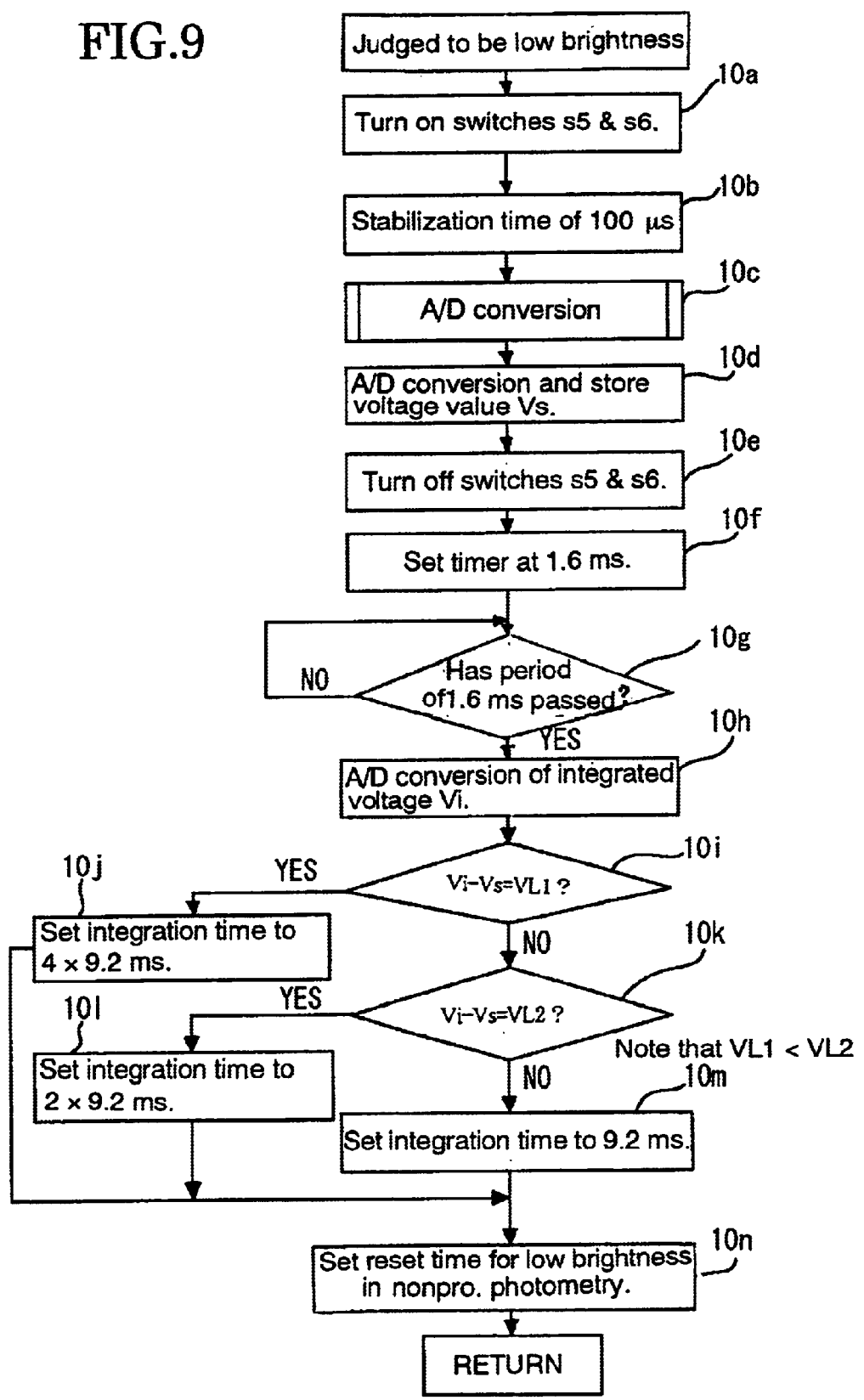
FIG. 9 is a flowchart illustrating operations performed where the brightness is judged to be low by the pre-photometric operation of the photometric apparatus in accordance with one embodiment of the invention.

If the brightness is judged to be low, a further measurement is made as described by referring to the flowchart of FIG. 9. In particular, in the same way as in pre-photometry, the switch s3 is turned on to select the integrator capacitor 21 as shown in FIG. 9. Under this condition, the switches s5 and s6 are turned on to establish a reset condition (step 10a). The instrument waits for a stabilization time of 100 μs (step 10b). Alternatively, if the used stabilization time is only about 1 ms in the pre-photometry, a stabilization time of 40 ms may be used. The analog output voltage from the operational amplifier 32 is converted into digital form (step 10c) and stored while taking the output voltage under the reset condition as Vs (step 10d). Then, the switches s5 and s6 are turned off, thus canceling the reset condition. An integration is started (step 10e). The timer (not shown) is set at 1.6 ms (step 10f). The analog value of the integrated voltage of the integrator capacitor 21 when a period of 1.6 ms has passed is converted into digital form and taken as Vi (steps 10g and 10h).

The given time T for integration in the nonprovisional photometry is established from the magnitude of the voltage difference (Vi–Vs). That is, if the magnitude of (Vi–Vs) is smaller than a given value VL1, the instrument is so set up that a longer given time (T=4×9.2 ms) is used for the nonprovisional photometry (steps 10i and 10j). If (Vi–Vs) is smaller than a given value VL2, the given time T is set to twice the given value of 9.2 ms, i.e., 18.4 ms (steps 10k and 10l). VL2 is greater in value than VL1. If the magnitude falls under none of these categories, the given time T for integration is set to the given time of 9.2 ms (step 10m).

Figure 10:
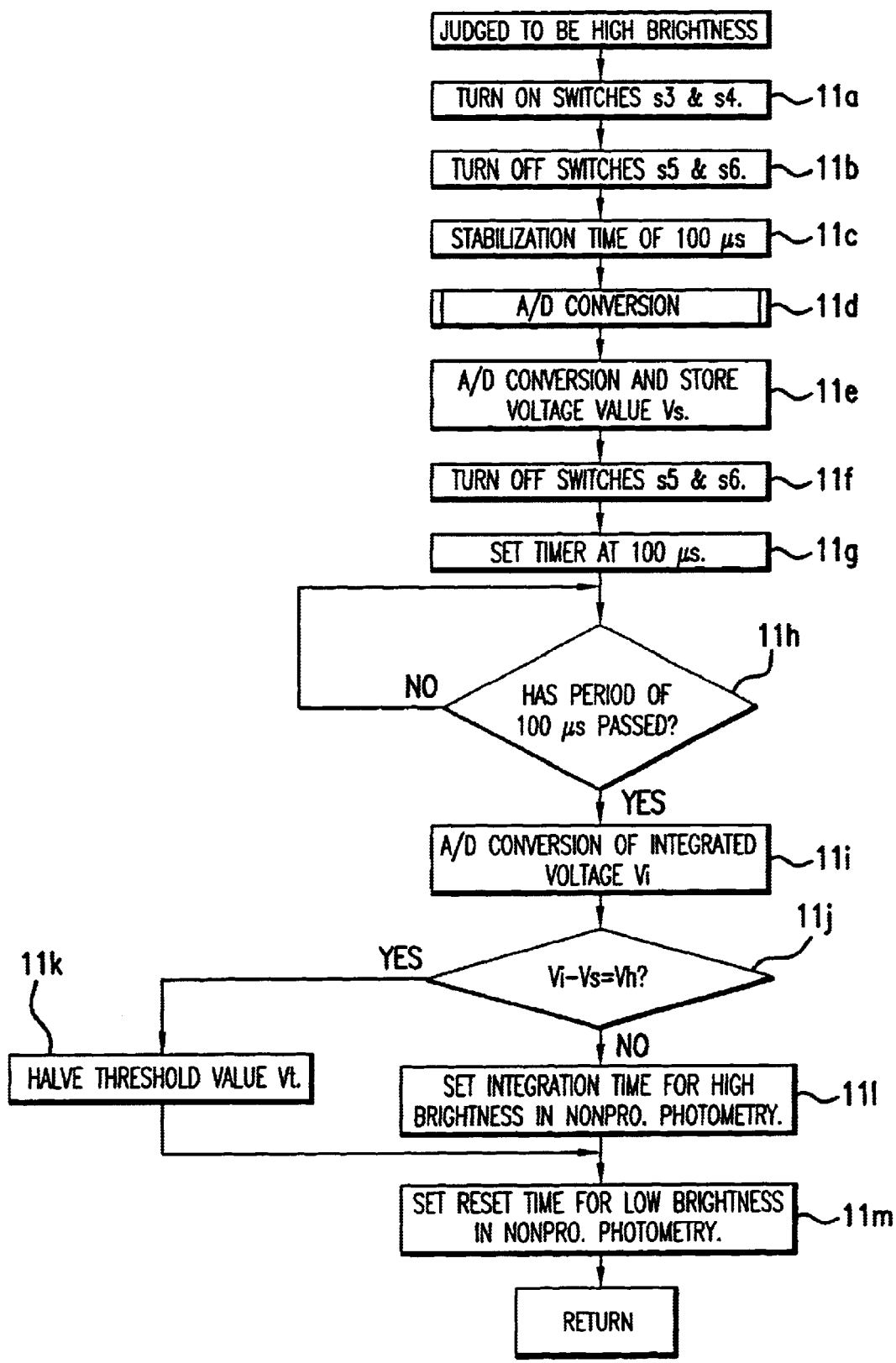
FIG. 10 is a flowchart illustrating operations performed when the brightness is judged to be high by the pre-photometric operation of the photometric apparatus in accordance with one embodiment of the invention.

The reset time Tr in the nonprovisional photometry is modified from the given value of 50 μs to a time of 100 μfor low brightness (step 10n). That is, during low brightness, the reset time Tr is made longer than the given time, for the following reason. During low brightness, the integrated voltage rises at a lower rate and so the instrument is more susceptible to noise such as residual voltage (charge). To avoid this, the residual voltage (charge) is reset sufficiently.

Where the brightness is judged to be high, a further measurement is performed as described by referring to the flowchart of FIG. 10. The switch s3 is turned off and the switch s4 is turned on to switch the integrator capacitor from the integrator capacitor 21 having a capacitance of 4700 pF to the integrator capacitor 22 (step 11a). The switches s5 and s6 are turned on to establish a reset condition (step 11b). The stabilization time for the output from the amorphous silicon optical sensor 11 may be set shorter (e.g., tens of microseconds) than during low brightness. After the passage of the stabilization time of 10 μs, the analog output voltage from the operational amplifier 32 is converted into digital form, and the output voltage Vs on resetting is stored (steps 11c, 11d, and 11e). Then, the timer (not shown) is set at 100 μs and the switches s5 and s6 are turned off. Integration using the integrator capacitor 22 is started (steps 11f and 11g). When a period of 100 μs passes, the integrated analog output voltage from the integrator capacitor 22 is converted into digital form and stored as Vi (steps 11h and 11i). The voltage difference (Vi–Vs) is calculated. If this difference is greater than a given value Vh, then the brightness is judged to be very high (i.e., very high brightness). The threshold voltage Vt for resetting the integration using the integrator capacitor 22 during nonprovisional photometry is set to half (1.75 V) the given value (3.5 V in the present embodiment) (steps 11j and 11k). The threshold value remains the given value unless the difference (Vi–Vs) is greater than Vh. The given time T for integration used during nonprovisional photometry is set to a time (9.2 ms) for high brightness (step 11l), and the reset time Tr is set to a time (10 μs) for high brightness (step 11m).

Figure 11A:
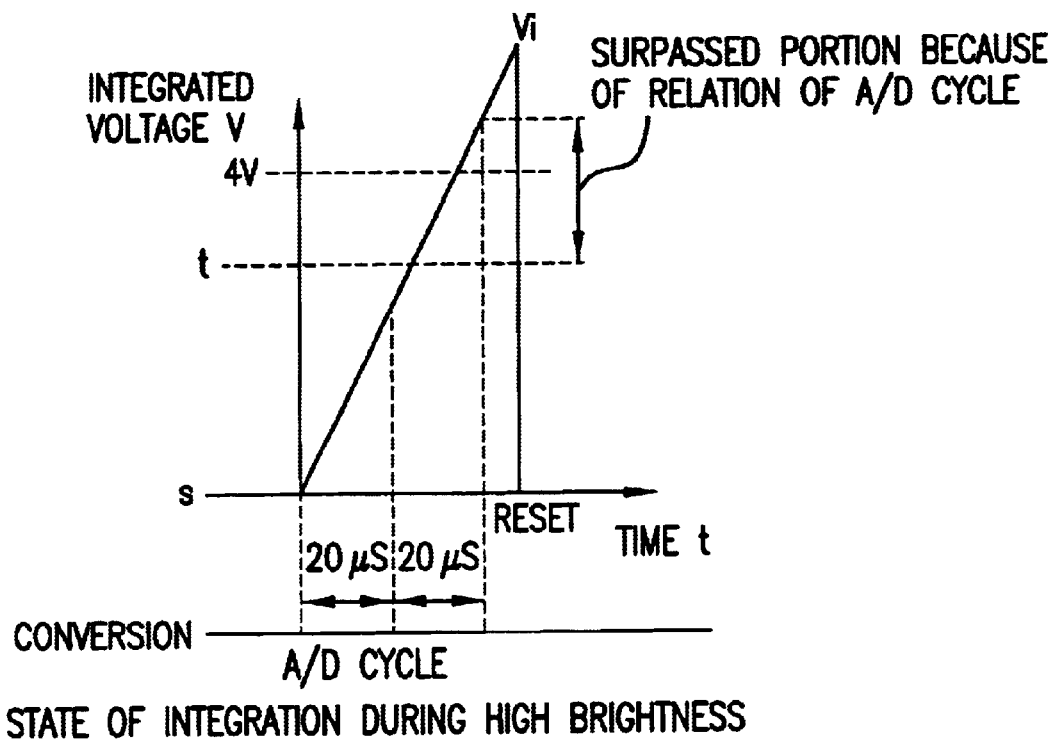
FIG. 11A is a diagram illustrating variations in a set threshold value where the brightness is judged to be high by the pre-photometric operation of the photometric apparatus in accordance with one embodiment of the invention.
Figure 11B:
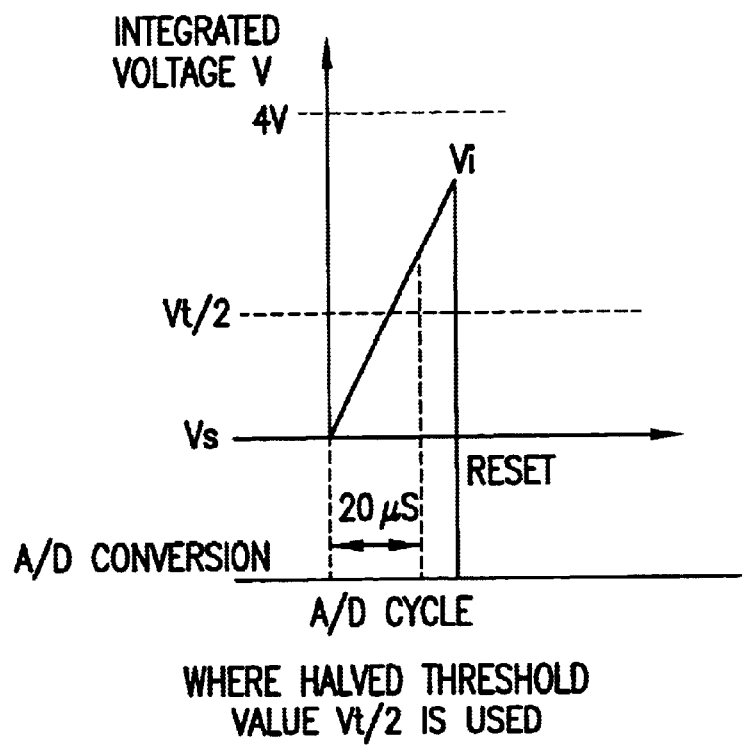
FIG. 11B is a diagram illustrating variations in a set threshold value where the brightness is judged to be high by a pre-photometric operation of the photometric apparatus in accordance with one embodiment of the invention.

The reason why the threshold value VT for resetting is set to half the value used for the case of very high brightness is as follows. The photocurrent I flowing into the integrator capacitor 22 is great and so the voltage value across the integrator capacitor 22 rises in a short time. Therefore, as shown in FIG. 11A, the interval at which the integrated analog output voltage from the integrator capacitor 22 is converted into digital form is set to 20 μs. The analog to digital conversion is performed. The difference (Vi–Vs) between the integrated voltage Vi of the integrator capacitor 22 and the start voltage Vs is found. If it is judged that the threshold value Vt (normally, 3.5 V) is exceeded, it is expected that the integrated voltage Vi will rise by an amount corresponding to the 20 μs. Therefore, the integrated voltage Vi will exceed the upper limit (4 V in the present embodiment) of the output from the operational amplifier 32 and goes out of the output range (saturated region) of the operational amplifier 32. Consequently, the integrated voltage Vi cannot be measured accurately. Accordingly, as shown in FIG. 11B, the threshold value Vt for resetting the integration using the integrator capacitor 22 is set to a lower value than normal (e.g., half of Vt (that is, Vt/2)). If the integrated voltage Vi passes beyond the threshold voltage Vt/2, the voltage value is held lower than the upper limit (4 V) of the output from the operational amplifier 32.

Figure 11C:
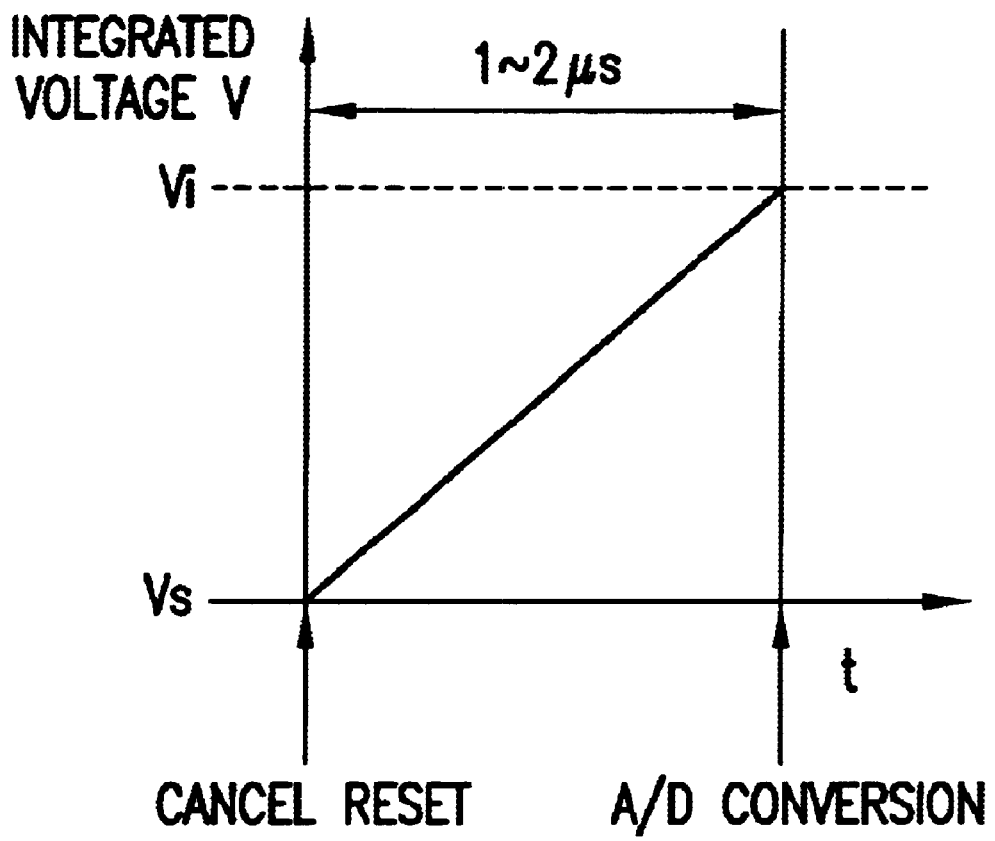
FIG. 11C is a diagram illustrating measurement of an integrated voltage where the brightness is judged to be high by the pre-photometric operation of a photometric apparatus in accordance with another embodiment of the invention.

Instead of subjecting the integrated voltage output to analog to digital conversion at regular intervals (every 20 μs in the present embodiment) during the integration time, a short integration time of 1 to 2 μs may be established, the integrated voltage may be subjected to analog to digital conversion, the integrated voltage value Vi may be found, and a resetting operation may be done every time as shown in FIG. 11C.

Figure 12:
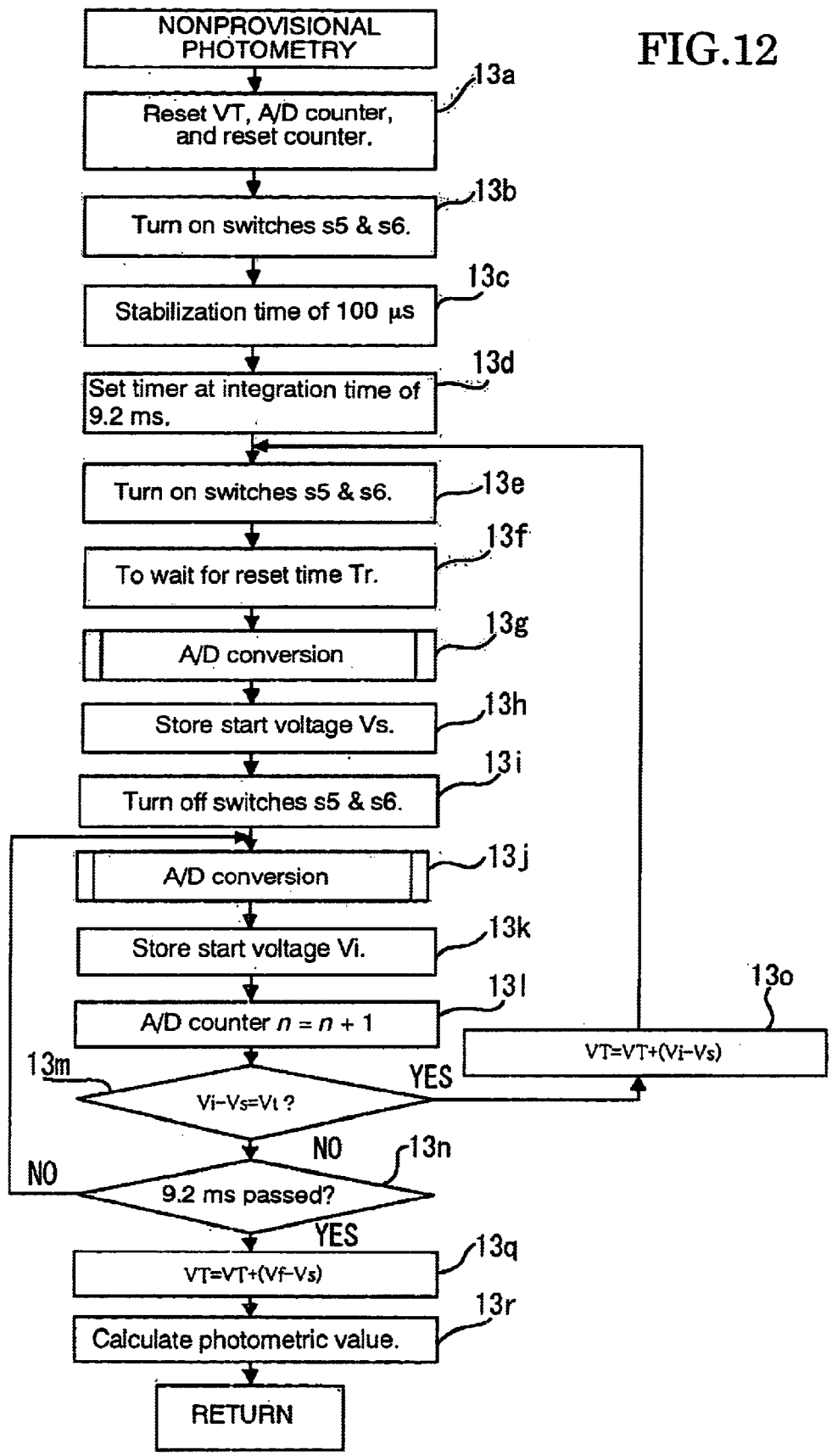
FIG. 12 is a flowchart illustrating a nonprovisional photometric operation of the photometric apparatus in accordance with one embodiment of the invention.

FIG. 12 is a flowchart illustrating the operation of the nonprovisional photometry (step 6h of FIG. 6). In FIGS. 13A–13D, integration time t is plotted on the horizontal axis and the integrated voltage V is on the vertical axis. These are graphs respectively indicating relations of very low brightness, low brightness, moderate brightness, and high brightness conditions in the nonprovisional photometry. FIG. 13A indicates a case where the given time T for integration is set to twice of 9.2 ms, or 18.4 ms in the very low brightness state, and the threshold voltage is set to 3.5 V. During very low brightness, the photocurrent I from the optical sensor 1 is small and so the threshold value Vt is not reached within the given time T. Therefore, in order to enhance the resolution, the given time T is set to twice the given value of 9.2 ms. In the case of low brightness, 4 times 9.2 ms can be selected as the given time T. FIG. 13B indicates a case where the given time T for integration is set to the given time of 9.2 ms in the low brightness condition, and the threshold voltage is set to 3.5 V. FIG. 13C indicates a case where the given time T for integration is set to the given time of 9.2 ms in the moderate brightness state, and the threshold voltage is set to 3.5 V. In this case, the photocurrent I from the optical sensor 1 is large and the time taken to reach the threshold value Vt is shorter. FIG. 13D shows a case in which the given time T for integration is set to a given value of 9.2 ms and the threshold voltage is set to 3.5 V during high brightness. The photocurrent I from the optical sensor 1 is increased, and the threshold value Vt is reached in a still shorter time. The processing speed of the CPU 10 cannot catch up with this. Therefore, it is necessary to select the integrator capacitor 22 having a capacitance of 4700 pF so that it takes longer to reach the threshold value Vt. In the case of very high brightness, the threshold value Vt is halved as mentioned previously. FIG. 13E is a graph indicating a part of FIG. 13C to a larger scale in the case of nonprovisional photometry during moderate brightness, depicting A/D conversion cycle at intervals of 20 $\mu$s and the reset time Tr (=50 $\mu$s).

Figure 13:
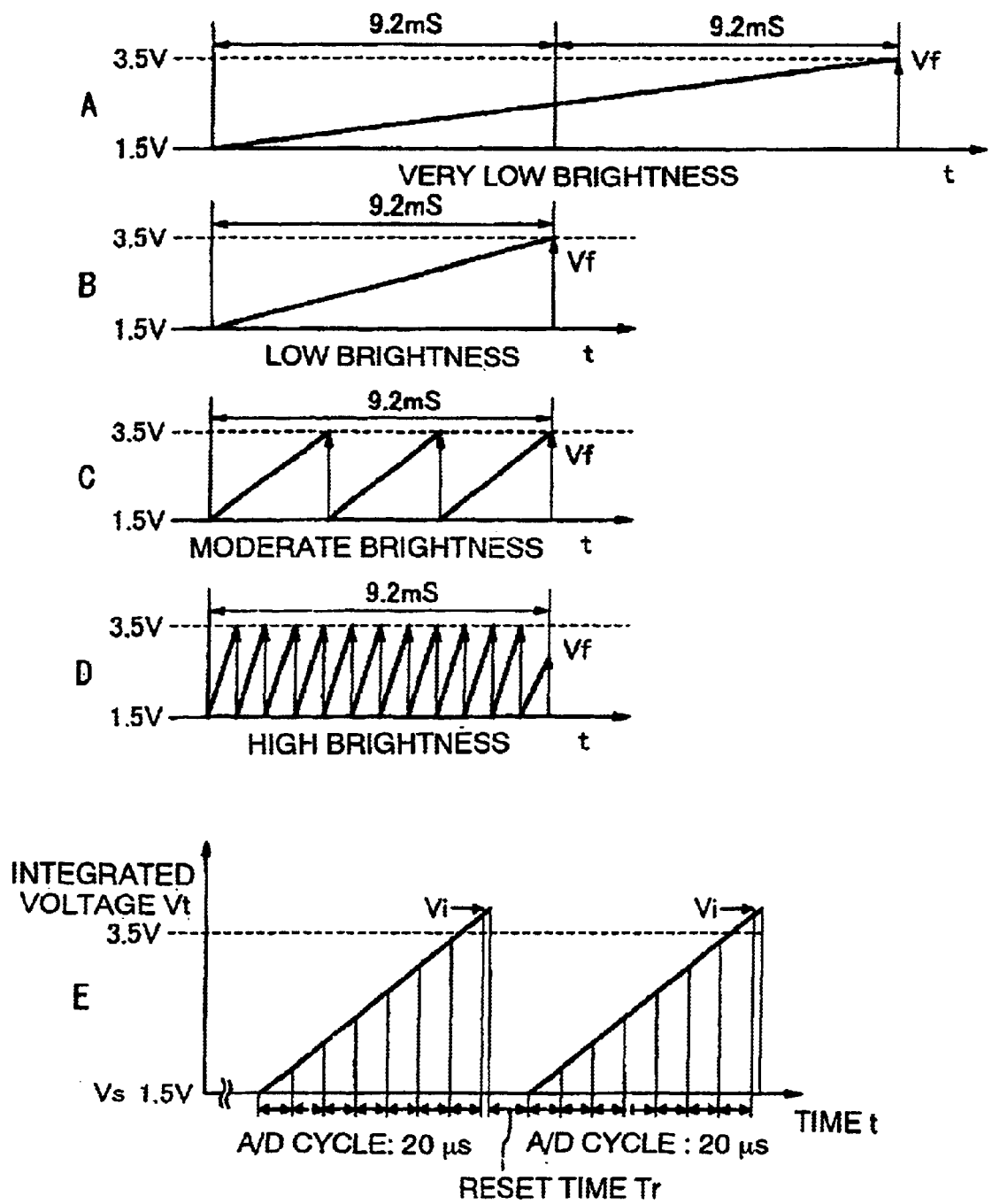
FIG. 13 is a graph illustrating the nonprovisional photometric operation of the photometric apparatus in accordance with one embodiment of the invention, and in which the integrated voltage is plotted on the vertical axis and time t is on the horizontal axis.

The operation in the nonprovisional photometry is next described by referring to the flowchart of FIG. 12 and to FIGS. 13 and 5. In the present embodiment it is assumed that the result of a decision made in pre-photometry is that the brightness is moderate. The following description identically applies to cases where the brightness is judged to be low or high except for parameters including the given time T for integration established for low or high brightness, the reset time Tr, and the threshold voltage Vt. If the result of the decision made in pre-photometry is that the brightness is moderate, the nonprovisional photometry is immediately executed. At the start of the nonprovisional photometry, the content N of the reset counter 7 is reset to zero, and the content n of an A/D cycle counter 9 in the CPU 10 is reset to zero. Furthermore, the value of the total integrated voltage VT in the storage means 6 is reset to zero (step 13a). The switches s5 and s6 are turned on, and the instrument waits until the stabilization time of 100 $\mu$s passes (steps 13b and 13c). Taking account of the effects of the alternating light source, the given time T for integration in the nonprovisional photometry is set to the average value of the half periods of 50 Hz and 60 Hz, or 9.2 ms (step 13d).As mentioned previously, in the case of very low brightness, a time that is two or four times longer is used as the given time T for integration. In the present embodiment, the given time T of 9.2 ms is entered into an integration time timer (not shown), which then starts to count. The instrument waits until the reset time Tr passes while the reset switches s5 and s6 are kept on (steps 13e and 13f). The reset time Tr for the case of moderate brightness is 50 $\mu$s. In the cases of low and high brightnesses, the time is set to modified values (i.e., 100 $\mu$s and 10 $\mu$s, respectively). On resetting, the output voltage from the operational amplifier 32 is subjected to analog to digital conversion, and the voltage value is stored as the integration start voltage Vs (steps 13g and 13h). In the present embodiment, the reference voltage value is approximately 1.5 V and so Vs is approximately 1.5 V, too. After a lapse of the reset time Tr, the switches s5 and s6 are turned off. The integrated voltage value V of the integrator capacitor 21 or 22, which is produced from the operational amplifier 32, is subjected to analog to digital conversion at intervals of 20 $\mu$s (steps 13i and 13j). The integrated voltage value obtained by this analog to digital conversion is stored as Vi (step 13k). Then, "1" is added to the content n of the A/D cycle counter 9 (step 13l). As mentioned previously, the content n of the A/D cycle counter 9 is reset to zero at the start of the nonprovisional photometry.

Then, a decision is made as to whether the voltage difference (Vi–Vs) satisfies Vi–Vs≧Vt (step 13m). As described above, Vt is set to 3.5 V. If the relation Vi–Vs≧Vt is not reached, a decision is made as to whether the given time T has passed. If the time has not yet passed, the program returns to the starting point on the loop, and analog to digital conversion of the integrated voltage value Vi in the next 20 $\mu$s-cycle is repeated (step 13n). If the relation Vi–Vs≧Vt has been reached, the value of the voltage difference Vi–Vs is added to VT and stored (step 13o). As described previously, the initial value of this VT is reset to zero at the start of the nonprovisional photometry. Then, "1" is added to the number of resets N in the reset counter means 7 (step 13p). The program returns to the initial point on the loop, and the aforementioned operations are performed. That is, the switches s5 and s6 are turned on, and the integrator capacitor 21 is discharged during the reset time Tr, i.e., resetting operation. When the reset time Tr has passed, the starting voltage Vs is subjected to digital to analog conversion and stored. After the passage of the reset time Tr, the switches s5 and s6 are turned off. The integrator capacitor 21 or 22 again integrates the photocurrent I from the optical sensor. Analog to digital conversion of the integrated voltage Vi is similarly repeated at intervals of 20 $\mu$s. A decision is repeatedly made as to whether the voltage difference Vi–Vs has exceeded Vt.

When the integration time counter completes the counting of the given time of 9.2 ms for integration, the integration is stopped. Analog to digital conversion is repeated several times. Let Vf be the average value. The difference between the voltage value Vf occurring at this time and the voltage value Vs at the start of the integration, or Vf–Vs, is added to VT and stored. The photometry is ended (steps 13n, 13q, and 13r).

When the integration time of 9.2 ms ends, the total integrated voltage value VT is the sum of the total value of the integrated voltage differences Vi–Vs accumulated on each resetting and the integrated voltage value difference Vf-Vs found by the final integration. The actual integration time t is the value n of the A/D cycle counter 9, indicating the number of cycles of analog to digital conversions, multiplied by a given period of 20 $\mu$s. That is, it is computed from t=n×20 $\mu$s. Alternatively, the actual integration time t is equal to the given time T (=9.2 ms) subtracted by the time taken to reset it. The actual integration time t may also be found from t=T−(N+1)•Tr.

In this way, the actual integration time t is different from the given time T (=9.2 ms) for integration but is the time for which the photocurrent I is actually integrated in the integrator capacitor 21 or 22 after the switches s5 and s6 have been turned off.

The brightness (photometric value) is measured based on Eq. (2), using the total integrated voltage value VT and actual integration time t obtained as described above. The capacitance C of the integrator capacitor 21 is 47 pF. In the case of high brightness, the integrator capacitor 22 is selected, and its capacitance C is 4700 pF. α is a value preset according to the photometric circuit. Accordingly, the brightness of the subject can be calculated based on Eq. (2) above, using the actual integration time t and the total integrated voltage value VT obtained by the nonprovisional photometry. Hence, accurate photometry can be performed.

The description is continued by referring back to the flowchart of FIG. 6. If photometric measurement of the brightness of the subject is completed in this way and a photometric value of 1 is obtained (step 6i), all the switches s1–s10 of the photometric circuit are turned off (step 6j), thus ending the photometric sequence.

If two-split photometry is executed (step 6k), the second photometric measurement is subsequently performed using the amorphous silicon optical sensor 12 as indicated by the flowchart of FIG. 6 and the switching timing chart of FIG. 5. The switch s1 is turned off, while the switch s2 is turned on (step 6l). The above-described nonprovisional photometric routine is repeated (step 6m). In particular, after the stabilization time of 10 ms for the optical sensor 12, the same operations are performed as in the previous photometry. Photometric value 2 is computationally found by the aforementioned method (step 6n). After the end, the switches s1–s6 are turned on and the switches s7–s10 are turned off (step 6j).

In the present embodiment described thus far, the difference Vi–Vs between the voltage value detected at the start of integration and the voltage value detected on A/D cycle is found. When this difference exceeds the threshold value Vt, the integrator capacitor 21 or 22 is reset. Alternatively, the voltage Vs at the start of integration may be clamped at a constant voltage, and a resetting operation may be performed when the integrated voltage Vi detected on A/D cycle reaches the given voltage Vt. The voltage difference may be computed during the resetting operation. In this way, the processing time is shortened. Furthermore, the reset time Tr may be varied according to the capacitance of the selected integrator capacitor 21 or 22 to increase the time taken to perform the integration. This enhances the accuracy.

In the inventive photometric apparatus and method described thus far, a photometric value is found based on the total integrated voltage value and on the integration time, the total integrated voltage value being owing to the photocurrent integrated in an integrator capacitor during a given period. In consequence, accurate photometry can be carried out. Furthermore, resetting of the integrator capacitor is repeated to find the total integrated voltage. This permits execution of high-resolution photometry. Additionally, the integration time can be found accurately by subtracting the reset time within the given time from the given time. Therefore, accurate photometry can be carried out. Also, the total voltage value owing to integration by an integrator capacitor within a given time can be found accurately. Hence, accurate photometry can be performed. Accurate photometry can be carried out, even if the amount of incident light is small or varies like an alternating current, by setting the given time to about 9.2 ms or an integral multiple of it. Further, the photometric circuit of the photometric apparatus in accordance with the present invention can be incorporated in an integrated circuit such as a microcomputer. This facilitates saving the space in the photometric apparatus and the cost. In addition, photometry is performed by integrating a photocurrent. Consequently, temperature compensation can be easily made. As a result, accurate photometry can be carried out.

What is claimed is:

1. A photometric apparatus comprising:
    at least one optical sensor for generating a photocurrent according to an amount of incident light;
    at least one integrator capacitor for integrating the photocurrent from said optical sensor;
    a voltage detection means for detecting a voltage across said integrator capacitor;
    an integration time-measuring means for measuring an integration time during which said integrator capacitor integrates the photocurrent, the integration time being a total time during which said integrator capacitor integrates;
    resetting-and-controlling means for resetting said integrator capacitor at least once during a given time when a voltage across said integrator capacitor exceeds a given voltage value during which time integration does not occur;
    a totalizing means for finding a total voltage value integrated into said integrator capacitor during the given time; and
    a photometric means for finding a photometric value based on said total voltage value and on said integration time from said integration time-measuring means.

2. A photometric apparatus comprising:
    at least one optical sensor for generating a photocurrent according to an amount of incident light;
    at least one integrator capacitor for integrating the photocurrent from said optical sensor;
    a voltage detection means for detecting a voltage across said integrator capacitor;
    an integration time-measuring means for measuring an integration time for which said integrator capacitor integrates the photocurrent;
    resetting-and-controlling means for resetting said integrator capacitor whenever the voltage across said integrator capacitor exceeds a given voltage value;
    a totalizing means for finding a total voltage value integrated into said integrator capacitor during a given time; and
    a photometric means for finding a photometric value based on said total voltage value and on said integration time from said integration time-measuring means;
    wherein the integration time after a lapse of said given time measured by said integration time-measuring means is equal to the given time subtracted by a time for which said resetting-and-controlling means are resetting said integrator capacitor within said given time.

3. The photometric apparatus of claims 1 or 2, wherein said given time is approximately 9.2 milliseconds or an integral multiple of it.

4. The photometric apparatus of claims 1 or 2, wherein said voltage detection means has a detector for detecting a voltage across said integrator capacitor at regular intervals of time, and wherein said given voltage value of said resetting-and-controlling means is set lower as the amount of incident light increases.

5. The photometric apparatus of claims 1 or 2, wherein said at least one integrator capacitor is at least two integrator capacitors having different capacitances, and wherein the at least two integrator capacitors are selectively used, only one at a time, according to the amount of the incident light.

6. The photometric apparatus of claim 5, wherein prephotometry is performed to measure the amount of the incident light prior to nonprovisional photometry, and wherein if said amount of incident light is larger, one of said integrator capacitors which has a larger capacitance is selected.

7. The photometric apparatus of claims 1 or 2, wherein said at least one optical sensor is at least two optical sensors which are selectively used, only one at a time.

8. The photometric apparatus of claim 1, wherein said voltage detection means has an analog-to-digital converter for converting the voltage across said integrator capacitor into digital value at regular intervals of time except during resetting performed by said resetting-and-controlling means, and wherein said integration time-measuring means measures the product of the number of conversions made by said analog-to-digital converter and said given period as said integration time.

9. The photometric apparatus, comprising:

at least one optical sensor for generating a photocurrent according to an amount of incident light;

at least one integrator capacitor for integrating the photocurrent from said optical sensor;

a voltage detection means for detecting a voltage across said integrator capacitor;

an integration time-measuring means for measuring an integration time for which said integrator capacitor integrates the photocurrent;

resetting-and-controlling means for resetting said integrator capacitor whenever the voltage across said integrator capacitor exceeds a given voltage value;

a totalizing means for finding a total voltage value integrated into said integrator capacitor during a given time; and a photometric means for finding a photometric value based on said total voltage value and on said integration time from said integration time-measuring means;

wherein said totalizing means adds up the difference between a voltage value developed across said integrator capacitor at a start of integration and a voltage value developed across said integrator capacitor immediately prior to resetting by the resetting-and-controlling means after the start of said integration on each resetting to thereby obtain a sum value, and wherein a difference between a voltage value developed across said integrator capacitor after a lapse of said given time and a voltage value developed across said integrator capacitor at the start of said integration is added to said sum value, thus deriving said total voltage value.

10. A photometric method for measuring the amount of incident light, comprising the steps of:

(a) producing a photocurrent according to an amount of incident light;

(b) integrating said photocurrent to produce an integrated voltage;

(c) detecting said integrate voltage corresponding to said integrated photocurrent;

(d) resetting the integration during a reset period at least once when said integrated voltage exceeds a given voltage and repeating the steps (b), (c), and (d);

(e) finding a total voltage value of said integrated voltage values integrated during a given time;

(f) measuring a total time for which said photocurrent is integrated excluding a time for said reset period; and (g) finding a photometric value based on said integration time and on said total voltage value.

* * * * *